| United States Patent [19] | [11] Patent Number: 4,968,739 |
| Nakanishi et al. | [45] Date of Patent: Nov. 6, 1990 |

[54] COMPOSITION AND METHOD FOR PRODUCING A METALLIC SINTERED BODY

[75] Inventors: Michio Nakanishi, Niiza; Takuya Miho, Kugagun, both of Japan

[73] Assignee: Daicel Chemical Industries, Ltd., Osaka, Japan

[21] Appl. No.: 442,756

[22] Filed: Nov. 29, 1989

[30] Foreign Application Priority Data

Nov. 29, 1988 [JP] Japan ............................ 63-301971
Aug. 17, 1989 [JP] Japan ............................ 1-211793

[51] Int. Cl.$^5$ ............................ C08K 5/09; C08K 3/08
[52] U.S. Cl. ............................ 524/322; 524/400; 524/439; 524/440; 524/599; 524/398; 524/399
[58] Field of Search ............... 524/322, 400, 439, 440, 524/599; 419/36; 264/63

[56] References Cited

U.S. PATENT DOCUMENTS

| 3,471,455 | 10/1969 | Binsbergen | 524/599 |
| 3,510,449 | 5/1970 | Nagato et al. | 524/599 |
| 3,523,920 | 8/1970 | Schultz | 524/599 |
| 4,113,480 | 9/1978 | Rivers | 264/63 |
| 4,158,688 | 6/1979 | Pett et al. | 264/63 |
| 4,207,226 | 6/1980 | Storm | 106/43 |
| 4,225,345 | 9/1980 | Adee et al. | 264/63 |
| 4,305,756 | 12/1981 | Wiech, Jr. | 75/211 |
| 4,387,067 | 6/1983 | Kobayashi et al. | 264/63 |
| 4,478,790 | 10/1984 | Huther et al. | 419/54 |
| 4,649,003 | 3/1987 | Hashimoto et al. | 264/63 |

FOREIGN PATENT DOCUMENTS

| 55-113510 | 9/1980 | Japan . |
| 55-115436 | 9/1980 | Japan . |
| 58-126901 | 7/1983 | Japan . |
| 65-011562 | 1/1988 | Japan . |
| 1603855 | 5/1977 | United Kingdom . |

*Primary Examiner*—Lewis T. Jacobs
*Attorney, Agent, or Firm*—Sughrue, Mion, Zinn, Macpeak & Seas

[57] ABSTRACT

A composition for producing a metallic sintered body consisting essentially of a mixture of a powered metal having an average particle size of not more than 50 microns with a lactone resin having a relative viscosity value in the range of from 1.15 to 3.20 is disclosed.

The composition has excellent properties such as mechanical strength of a green body thereof, and only a short time being necessary for removal or elimination of binder in comparison with conventional sintering compositions.

Furthermore, the binder in the present composition is substantially composed of a single component; accordingly, manufacturing process control can be simplified by use of the lactone resin.

Furthermore, a method for producing a metallic sintered body using such composition is also disclosed.

10 Claims, 1 Drawing Sheet

COMPOSITION AND METHOD FOR PRODUCING A METALLIC SINTERED BODY

FIELD OF THE INVENTION

The present invention relates to a composition for producing a metallic sintered body, and a method for producing the metallic sintered body.

The composition for producing a metallic sintered body according to the present invention has excellent properties such as mechanical strength of a green body thereof, and only a short time being necessary for removal or elimination of a binder in comparison with conventional sintering compositions.

The binder in the present composition is substantially composed of a single type of component.

BACKGROUND OF THE INVENTION

For more than about two or three decades, the art for producing a metallic sintered body from powdered metallic materials has been well known in the field of metallurgy.

This art is generally referred to as injection powder metallurgy or metal injection molding (MIM).

The powdered metallic materials are mixed with a binder and then formed into a desired shape by extrusion molding or injection molding, and/or compression molding, to form what is commonly referred to as a green body.

The green body is heated by exposing it to a high temperatures atmosphere to partially remove or eliminate the binder by oxidation or thermal decomposition of the binder, the resultant product being referred to as a brown body.

The brown body is then sintered to provide a fusion of the powdered metallic materials and to completely remove or eliminate the binder, by exposing it to a very high temperature atmosphere, for example, 600° C. to 1,000° C., thereby producing the desired shaped metallic product with desired surface appearance, strength, etc., this being called a silver body that is the desired product.

In the production of the green body in the manner described hereinabove, there have heretofore been used thermoplastics such as polyethylene, polypropylene, polystyrene, polyamide, and cellulose and derivatives thereof; thermosetting plastics such as epoxy resins, phenolic resins, polyimide resins, natural waxes such as animal wax, China wax, wool wax, vegetable wax, carnauba wax, Japan wax, etc., synthesis waxes such as montan wax derivatives, paraffin wax derivatives, microcrystalline wax derivatives, higher monohydric alcohols such as cetyl alcohol, higher fatty acids such as capric acid, and glycerides such as tripalmitin, hydrocarbon waxes such as low molecular weight polyethylene, etc., and a mixture thereof as a binder for a powdered metallic material.

Also, an oxygen-containing wax type binder is disclosed in Japanese Unexamined Patent Publication (Kokai) No 20775/1983 (USP 4,649,003).

Also ethylene-vinyl acetate copolymer, low density polyethylene, methacrylate copolymer, phthalic ester, etc., and a mixture thereof are disclosed in Japanese Unexamined Patent Publication (Kokai) No. 229403/1984.

However, several facts indicate the need for improvements in such sintering compositions, particularly with respect to the binder.

A first fact is that a binder as described hereinabove, for example, thermoplastic or thermosetting plastics, have disadvantages such as that a long time is required for the removal or elimination of them.

A second fact is that a binder cannot be removed or eliminated perfectly in the removal or elimination process therefor.

A third fact is that such waxes typically have disadvantages such as low mechanical strength in a green body.

A fourth fact is that a binder composition is composed of complicated components.

SUMMARY OF THE INVENTION

It is an object of the present invention to provide an improved composition for producing a metallic sintered body, and an improved method for producing a metallic sintered body.

As a result of extensive investigations noting the foregoing background, the inventors of this invention have now found that it is possible to solve the problems and achieve the objects as noted hereinabove by use of a composition consisting essentially of a powdered metallic material and a lactone resin.

The powdered metal to be used has an average particle size of not more than 50 microns, and the lactone resin to be used has a relative viscosity value in the range of from 1.15 to 3.20.

The lactone resin to be used for producing a metallic sintered body can provide excellent mechanical strength in a green body, i.e.. a shaped molded body before heating and sintering.

Accordingly product loss can be reduced in the case of shipment and storage.

Furthermore, with the binder to be used in the present invention substantially composed of single type of resin component, it is only required to adjust the mixing ratio of the lactone resin to the powdered metallic material; accordingly, manufacturing process control can be simplified.

DETAILED DESCRIPTION OF THE INVENTION

Figure 1:
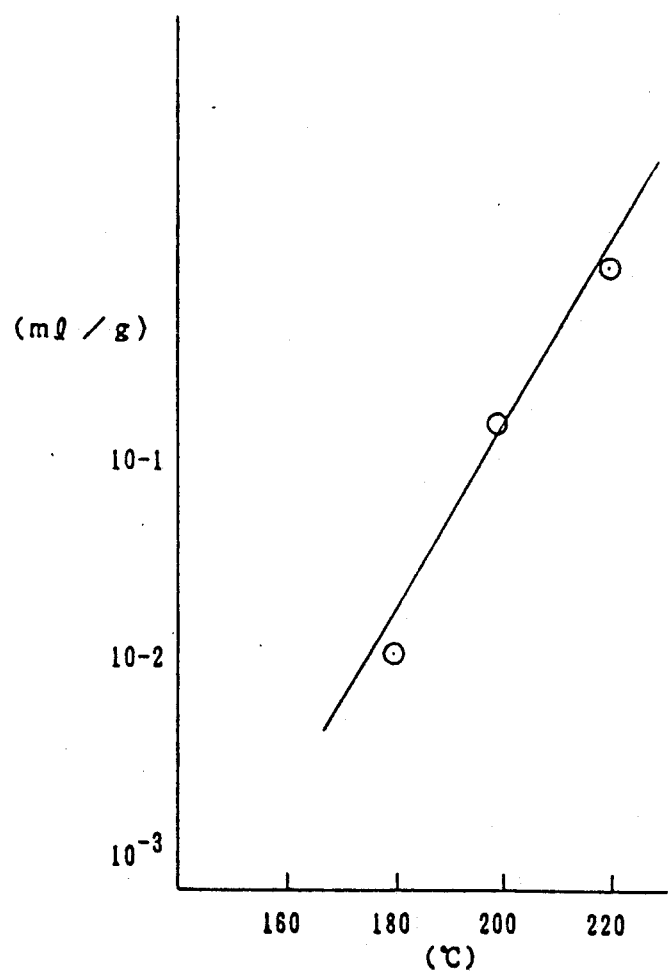
FIG. 1 is a graph illustrating results obtained in measurement of temperature dependence of flow properties in a melted composition composed of a powdered metal and a lactone resin in which temperatures are plotted on the abscissa and values measured with a flow-tester are plotted on the ordinate (logarithm scale).

The present invention is described hereinafter in more detail.

A lactone resin to be used in the present invention can typically be prepared by subjecting lactone monomers such as $\epsilon$-caprolactone or trimethyl caprolactone or $\delta$-valerolactone, etc., to ring-opening polymerization in the presence of an appropriate catalyst and an initiating agent having at least one active hydrogen atom.

However, in order to obtain a lactone resin to be used in the present invention, which has a relative viscosity value in a range of from 1.15 to 3.20, a very minor amount (e.g., less than 0.1% by weight, more specifically approximately 0.02% or less) of water normally present in the monomer is utilized as the initiating agent having at least one active hydrogen atom, without addition of any other initiating agents.

As the amount of water in the lactone monomer is lessened, the relative viscosity value of the lactone resin is larger, that is, the molecular weight of the resin is higher.

In preparing the lactone resin a catalyst is preferably used.

As the catalyst used for the ring-opening polymerization there can be mentioned an organic titanium compound, and an organic tin compound, and a stannous halide such as stannous chloride.

Preferably the catalyst is used in an amount of from 0.1 to 5.000 ppm by weight based on lactone monomer, more preferably from 10 to 100 ppm.

It is appropriate that the reaction temperature be from 100° to 230° C. and preferably the reaction is carried out under an inert gas atmosphere.

If the reaction temperature is higher than 230° C., such causes thermal decomposition of the lactone polymer, and the molecular weight of the lactone polymer does not increase.

On the other hand, in the case of lower temperatures than 100° C. reaction velocity is slow, and productivity is poor.

Thermoplastic lactone resins having various molecular weight (that is, corresponds to the relative viscosity) are produced and used in many kinds of fields. e.g.. because of having a property of low melting temperature of approximately 60° to 80° C.

The relative viscosity value was measured with a capillary viscometer (Ubbelohde's viscometer) according to Japanese Industrial Standard K 6726 in the present invention.

A toluene solution containing 1% by weight of a lactone resin was used to measure.

Measurements of the relative viscosity value were carried out while maintaining a temperature of 25.00° ±0.05° C.

Lactone resin having a relative viscosity value in the range of from 1.15 to 3.20 can be used in the present invention.

A preferable relative viscosity value of the lactone resin to be used is a range of from 1.50 to 3.20.

Such resin is rigid and tough at ordinary temperatures (i.e., at about 20° C.).

It is noted that the lactone resins having a relative viscosity value in a range of from 1.15 to 3.20 are commercially available for various kinds of intended uses.

For example, lactone resin is used as a toggle operating body (Japanese Unexamined Patent Publication (Kokai) No. 240492/1985), a composition for a modeling compound (Japanese Unexamined Patent Publication (Kokai) No. 42679/1986), a medical gypsum material (Japanese Unexamined Patent Publication (Kokai) No. 81042/1983), a splint material, a face mask for shielding from radioactive rays, or a modeling material for a periwig (Japanese Unexamined Patent Publication (Kokai) No. 215018/1985).

Specific examples of lactone resin having a relative viscosity value of from 1.15 to 3.20 include caprolactone H-1, H-4, H-5, and H-7, which are manufactured and commercially supplied by Daicel Chemical Industries, Ltd.

Lactone resins H-5 and H-7 are more preferably used, although the other above-described grades on the market can be also used.

Also, it is possible to use either one kind of lactone resin or a mixture composed of two or more kinds thereof.

In the case of using a mixture composed of two grades of the lactone resins, it has an effect of an improved flexural strength in molds (green body) in comparison with a corresponding single grade of resin. Accordingly, it is more suitable for a mold having thin thickness parts in structures which might be easy to break.

The subject matter of the present invention involves the use of a caprolactone resin as a binder for a powdered metallic material in place of thermoplastics such as polypropylene, polyethylene, and the like, and waxes such as carnauba wax, paraffin wax and the like.

One beneficial effect of the present invention is that the time required (dewaxing time and sintering time) to remove or eliminate the binder from shaped molds (green body) can be shortened; thereby, productivity can be promoted.

Also, stearic acid or a metal stearate, which are conventionally used as a lubricant in molding of resin, can be blended optionally.

As a result of blending of a lubricant, the ability of releasing from a molding die can be improved, and flowability of the melted composition can be improved in molding under heating.

Thereby, a shaped molded body having an excellent surface appearance, such as smoothness or glossiness, can be obtained.

The optional stearic acid or a metal stearate is preferably used in an amount of from 0.1 to 5% by weight based on the total weight of the composition, and more preferably from 0.3 to 2% by weight.

In the case that the amount of the stearic acid or metal stearate is less than 0.3%, any lubricating effect is low.

On the other hand in the case of the mixing amount of more than 5%, the lubricating effect cannot be further improved, and on the contrary, undesired harmful effects tend to occur.

Conditions for producing a metallic sintered body according to the present invention are further described hereinafter.

(a) Mixing amount of lactone resin in a green body:

The mixing amount of the lactone resin is preferably from 5 to 30% by weight, based on the total weight of the composition, and more preferably approximately 10%.

In the case that the amount of the lactone resin is less than 5%, flowability of the melted composition is not only insufficient and difficult to mold, but also the shaped mold (green body) having desired strength can best be obtained.

On the other hand, in case of the mixing amount of more than 30%, the time required to remove the resin is extended, and there further occurs a volume shrinkage in a brown body or a silver body, and still further there occurs an undesired tendency toward brittleness in the brown body or the silver body.

A mixing amount range of from 8 to 10% is most preferable because of a good balance in various properties.

FIG. 1 is a graph illustrating example results obtained in measurement of the temperature dependence of flow properties in the melted composition composed of a powdered SUS 316L stainless steel having an average particle size of 12 μm and a polycaprolactone resin having a relative viscosity value of 2.34, in which a mixing ratio of the caprolactone resin to the powdered metal was 10/90 by weight; in FIG. 1, temperatures are plotted on the abscissa and values measured with a flow-tester (manufactured by Shimazu Mfg. Co., Ltd., a loading weight of 10 kg/cm$^2$ a nozzle diameter of 1 mm $\phi \times$ a tube length of 10 mm, preheating time of 10 minutes) are plotted on the ordinate (logarithm scale).

(b) Average particle size of a powdered metallic material:

The average particle size is preferably from 1 to 50 $\mu$m.

An average particle size smaller than 1 $\mu$m is not preferable because of a large specific surface area of the powdered metal.

On the other hand an average particle size larger than 50 $\mu$m is not preferable because of considerable decline of mechanical strength in a green body before heating and in a brown body or a silver body after heating and sintering.

(c) Pressure condition in molding of a green body:

Molding pressures are preferably from 150 to 1.000 kg/cm$^2$.

A molding pressure lower than 150 kg/cm$^2$ is not preferable because of a lack in dimensional precision of a mold.

On the other hand even though the molding pressures are higher than 1.000 kg/cm$^2$, no further advantage is obtained.

(d) Temperature condition in molding of a green body:

Molding temperatures are preferably from 150 to 230° C.

A molding temperature lower than 150° C. is not preferable, because flowability of a melted composition is too low to mold.

On the other hand, a molding temperature higher than 230° C. is not preferable because of decomposition of the lactone resin, though flowability is elevated.

In passing, there is a relationship between temperature conditions and pressure conditions in molding, namely, lower temperatures can be applied in the case of higher pressure conditions.

Flowability . i.e.. viscosity of a composition composed of a mixture of a powdered metallic material with a lactone resin is a significant condition in melting, and it is preferable that a flow condition of being easy to flow is applied in case of a use of a complex shaped mold. Injection molding, extrusion molding, and/or compression molding can be applied.

(e) Dewaxing condition:

(i) Heating speed

The heating speed is preferably from +5 to 100° C./hour. It is not preferable that the speed is more than +100° C./hour because there occurs small holes or cracks by foaming and then a usable brown body or silver body cannot be obtained.

On the other hand, it is not preferable that the speed is not more than +5° C./hour, because there is poor in actual productivity on account of too slow heating-up speed.

(ii) Heating temperature

The heating temperature is preferably 250° to 800° C. It is not preferable that the heating temperature is less than 250° C., because the lactone resin which is a binder cannot be sufficiently removed or eliminated, and would remain in a sintered metallic mold.

On the other hand, it is not preferable that the heating temperature is more than 800° C., because there tends to occur an imprecision in dimensions of the sintered metallic molded body produced.

(iii) Retention time in heating

The retention time is preferably up to 15 hours. The retention time is not necessarily indispensable in case of manufacturing a mold having thin parts in the structure, because the resin can be sufficiently totally removed during the initial heating process.

On the other hand, the lactone resin can be removed from any shaped green body, even having thick parts in the structure, within 15 hours.

(iv) Atmosphere in heating and sintering

It is preferable that air atmosphere is applied in a low temperatures process, and nitrogen gas or a mixture of nitrogen and hydrogen gas atmosphere is applied in a high temperatures process, from the viewpoint of prevention of oxidation in metallic materials. The sintering process (high temperatures) can be also carried out in vacuum.

It is preferable that a green body is buried into inactive alumina or silica and or zirconia powder in heating and sintering when the present invention is put into practice. Thereby not only is an effect of retention of shape of the green body provided, but also exhausting effect of melted lactone resin is promoted owing to capillary phenomenon, whereby heating time can be decreased.

In the following, the present invention is further illustrated by examples and comparative examples more specifically.

EXAMPLE 1

90 parts by weight of a powdered SUS 316L stainless steel having an average particle size of from 5 to 8 $\mu$m and 10 parts by weight of a caprolactone resin having a relative viscosity value of 2.34 were mixed by a compression kneader while maintaining a temperature of 135° C. for a period of 1 hour, followed by crushing after cooling to prepare a mixed composition having an average particle size of 2 mm.

Next an injection pressure of 700 kg/cm$^2$ and an injection temperature of 180° C. were applied to form a cylindrical mold having tapered thickness of wall, having a height of 45 mm and maximum thickness of 20 mm and minimum thickness of 3 mm and maximum diameter of 45 mm and minimum diameter of 24 mm, followed by dewaxing by burying in alumina powder under the condition of a heating speed of 30° C./hour and a heating temperature of 500° C. and a dewaxing time of 10 hours, followed by sintering in a hydrogen gas atmosphere while maintaining a temperature of 1,200° C. for 4 hours to obtain an excellent metallic sintered body.

EXAMPLE 2

The same procedures as described in Example 1 were repeated except that 90 parts by weight of Fe-Ni alloy having an average particle size of from 4 to 7 $\mu$m was used again in place of the stainless steel component, to obtain an excellent metallic sintered body.

EXAMPLE 3

The same procedures as described in Example 1 were repeated, except that 92 parts by weight of a powdered SUS 316L stainless steel and 8 parts by weight of a polycaprolactone resin were used in place of the component amounts used in Example 1, to obtain an excellent metallic sintered body.

EXAMPLE 4

The same procedures as described in Example 1 were repeated, except that 91 parts by weight of a powdered SUS 316L stainless steel and 9 parts by weight of a polycaprolactone resin were used, to obtain an excellent metallic sintered body.

EXAMPLE 5

The same procedures as described in Example 3 were repeated except that additionally 0.5 part by weight of stearic acid (supplied by Wako Chemicals Co.) was mixed into the total amount of the lactone resin and the powdered metal, to obtain an excellent metallic sintered body.

Torque (corresponding to melting viscosity) in melting was decreased to ⅔ in comparison with Example 3 in which the conditions were identical except for mixing of stearic acid.

Furthermore, the loading power required to be released from a molding die was decreased to 60%, that is, releasing ability from a molding die was improved.

EXAMPLE 6

The same procedures as described in Example 3 were repeated, except that additionally 1 part by weight of magnesium stearate (supplied by Wako Chemicals Co.) was mixed into a total amount of the lactone resin and the powdered metal to obtain an excellent metallic sintered body.

Torque in melting was not decreased in comparison with Example 3 in which the conditions are identical except for mixing of magnesium stearate; however, the loading power required to be released from a molding die was decreased to the extent of not being capable of measurement, that is, releasing ability from a molding die was considerably improved.

EXAMPLE 7

The same procedures as described in Example 1 were repeated, except that 91 parts by weight of a powdered carbonyl iron having an average particle size of from 5 to 8 $\mu$m was used in place of powdered SUS 316L stainless steel, to obtain an excellent metallic sintered body.

EXAMPLE 8

The same procedures as described in Example 1 were repeated, except that 10 parts of polycaprolactone resin having a relative viscosity value of 1.50 were used in place of the polycaprolactone resin used in Example 1, to obtain an excellent metallic sintered body.

EXAMPLE 9

The same procedures as described in Example 1 were repeated, except that 8 parts of polycaprolactone resin having a relative viscosity value of 1.93 were used in place of the polycaprolactone resin used in Example 1, to obtain an excellent metallic sintered body.

EXAMPLE 10

The same procedures as described in Example 6 were repeated, except that 8 parts of polycaprolactone resin having a relative viscosity value of 1.28 were used in place of the polycaprolactone resin used in Example 6, to obtain an excellent metallic sintered body.

EXAMPLE 11

The same procedures as described in Example 6 were repeated except that 8 parts of polycaprolactone resin having a relative viscosity value of 1.93 were used in place of the polycaprolactone resin used in Example 6, to obtain an excellent metallic sintered body.

COMPARATIVE EXAMPLES

The same procedures as described in the foregoing Examples were repeated, except that the polycaprolactone resins were replaced with a mixture composed of polypropylene resin and paraffin wax, and the compositions were kneaded while maintaining a temperature of 200° C.

A total time of approximately 40 hours was required for conducting a dewaxing process and a sintering process in order to obtain an excellent metallic sintered body.

While the invention has been described in detail and with reference to specific embodiments thereof, it will be apparent to one skilled in the art that various changes and modifications can be made therein without departing from the spirit and scope thereof.

What is claimed is:

1. A composition for producing a metallic sintered body consisting essentially of a mixture of a powdered metal having an average particle size of not more than 50 microns and a lactone resin having a relative viscosity value in the range of from 1.15 to 3.20.

2. A composition as set forth in claim 1, wherein said lactone resin has a relative viscosity value in the range of from 1.50 to 3.20.

3. A composition as set forth in claim 1, wherein said lactone resin is prepared by ring-opening polymerization of $\epsilon$-caprolactone monomer.

4. A composition as set forth in claim 1, wherein said powdered metal has an average particle size range of from 5 to 10 microns.

5. A composition as set forth in claim 1, wherein said composition additionally includes stearic acid or a metal stearate.

6. A composition as set forth in claim 5, wherein said metal stearate is magnesium stearate or calcium stearate.

7. A composition as set forth in claim 5, wherein said stearic acid or metal stearate is present in an amount of from 0.1 to 5% by weight, based on the total weight of the composition.

8. A composition as set forth in claim 5, wherein said stearic acid or metal stearate is present in an amount of from 0.3 to 2% by weight, based on the total weight of the composition.

9. A composition as set forth in claim 1, wherein said lactone resin is present in an amount of from 5 to 30% by weight, based on the total weight of the composition.

10. A composition as set forth in claim 1, wherein said lactone resin is present in an amount of from 8 to 10% by weight, based on the total weight of the composition.

* * * * *